United States Patent
Schoenauer et al.

(10) Patent No.: US 9,890,016 B2
(45) Date of Patent: Feb. 13, 2018

(54) POSITION RECOVERY VIA DUMMY LANDING PATTERNS

(71) Applicants: Uwe Schoenauer, Berlin (DE); Donald F. Cominelli, Berlin (DE); Shan Li, Hangzhou (CN); HengFeng Xie, Hangzhou (CN)

(72) Inventors: Uwe Schoenauer, Berlin (DE); Donald F. Cominelli, Berlin (DE); Shan Li, Hangzhou (CN); HengFeng Xie, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 281 days.

(21) Appl. No.: 14/443,890

(22) PCT Filed: Nov. 29, 2012

(86) PCT No.: PCT/CN2012/085553
§ 371 (c)(1),
(2) Date: May 19, 2015

(87) PCT Pub. No.: WO2014/082258
PCT Pub. Date: Jun. 5, 2014

(65) Prior Publication Data
US 2015/0314985 A1 Nov. 5, 2015

(51) Int. Cl.
*B66B 1/34* (2006.01)
*B66B 3/02* (2006.01)
(Continued)

(52) U.S. Cl.
CPC ............ *B66B 1/3492* (2013.01); *B66B 3/023* (2013.01); *G01D 5/12* (2013.01); *G01D 5/3473* (2013.01)

(58) Field of Classification Search
USPC ........................................................ 187/394
(Continued)

(56) References Cited

U.S. PATENT DOCUMENTS

| 4,083,430 A | 4/1978 | Gingrich |
| 5,153,390 A | 10/1992 | Barkman et al. |

(Continued)

FOREIGN PATENT DOCUMENTS

| CN | 1491878 A | 4/2004 |
| CN | 102196987 A | 9/2011 |

(Continued)

OTHER PUBLICATIONS

Notification of Transmittal of the International Search Report and the Written Opinion of the International Searching Authority, or the Declaration for PCT/CN2012/085553, issued on Aug. 22, 2013, dated Sep. 5, 2013, 12 pp.

(Continued)

*Primary Examiner* — David Warren
(74) *Attorney, Agent, or Firm* — Cantor Colburn LLP (57) ABSTRACT

An elevator system (10) includes an elevator hoistway (12) having a plurality of landings (14), an elevator car (16) configured to move within the elevator hoistway (12), and a position determining system (40) having a plurality of landing position indicators (48) and a plurality of dummy position indicators (50). At least one of the landing position indicators (48) is mounted proximate to each of the plurality of landings (14). Each dummy position indicator (50) is mounted within the elevator hoistway (12) at a predetermined vertical position between various of the plurality of landing position indicators (48). The position determining system (40) additionally includes a sensor (42) configured to determine when the elevator car is adjacent one of the plurality of landing position indicators (48) or one of the (Continued)

plurality of dummy position indicators (50). The plurality of landing position indicators (48) and the plurality of dummy position indicators (50) are positioned to form a sequence of unique patterns. The position determining system is more cost effective and timesaving than the absolute position reference systems.

21 Claims, 6 Drawing Sheets (51) Int. Cl.
    *G01D 5/12*     (2006.01)
    *G01D 5/347*     (2006.01)
(58) Field of Classification Search
    IPC ............. B66B 1/34,3/02, 1/3492, 3/023; G01D 5/12, 5/34, 5/3473
    See application file for complete search history.

(56) References Cited

U.S. PATENT DOCUMENTS

| | | | | |
|---|---|---|---|---|
| 5,502,380 | A * | 3/1996 | Sittler | F16K 37/0033 137/554 |
| 6,116,381 | A * | 9/2000 | Jalbert | B66B 3/023 187/391 |
| 6,874,244 | B2 | 4/2005 | Birrer et al. | |
| 2005/0105101 | A1* | 5/2005 | Duling | G01D 5/34 356/614 |
| 2007/0012547 | A1* | 1/2007 | DePaso | B65G 43/00 198/810.03 |
| 2007/0095617 | A1* | 5/2007 | Finn | B66B 1/3492 187/393 |
| 2007/0227831 | A1* | 10/2007 | Zaharia | B66B 1/3492 187/394 |
| 2008/0135342 | A1* | 6/2008 | Thumm | B66B 1/32 187/247 |
| 2008/0190710 | A1* | 8/2008 | Shiratsuki | B66B 5/12 187/393 |
| 2008/0230325 | A1* | 9/2008 | Chida | B66B 5/0031 187/393 |
| 2008/0283343 | A1* | 11/2008 | Kunz | B66B 1/3492 187/394 |
| 2011/0147135 | A1* | 6/2011 | Birrer | B66B 1/3492 187/393 |
| 2012/0271457 | A1* | 10/2012 | Sachs | G01D 5/34784 700/275 |
| 2013/0264150 | A1* | 10/2013 | Koba | B66B 1/2458 187/382 |
| 2014/0183346 | A1* | 7/2014 | Kato | G01D 5/3473 250/231.14 |
| 2015/0354992 | A1* | 12/2015 | Murokita | G01D 5/3473 318/640 |
| 2016/0145078 | A1* | 5/2016 | Lee | B66B 29/06 198/323 |
| 2016/0159617 | A1* | 6/2016 | Salminen | B66B 17/34 187/360 |
| 2016/0214832 | A1* | 7/2016 | Banno | B66B 5/06 |
| 2016/0311649 | A1* | 10/2016 | Puranen | B66B 5/0018 |
| 2017/0066625 | A1* | 3/2017 | Shiratsuki | B66B 1/3492 |
| 2017/0137257 | A1* | 5/2017 | Mochizuki | B66B 5/0018 |

FOREIGN PATENT DOCUMENTS

| | | |
|---|---|---|
| CN | 102556791 A | 7/2012 |
| CN | 102745563 A | 10/2012 |
| DE | 102009037435 A1 | 2/2011 |
| JP | 05043159 A | 2/1993 |
| JP | H0781860 A | 3/1995 |
| JP | 2011102163 A | 5/2011 |
| WO | 2005035418 A1 | 4/2005 |

OTHER PUBLICATIONS

Supplementary European Search Report for Appln. No. 12889350.0-1705/2925653; dated Aug. 7, 2016; 8 pages.
Chinese Office Action and Translation; CN Applkication No. 201280077407.3; dated Jun. 27, 2016, pp. 1-9.
Chinese Office Action and Translation; CN Applkication No. 201280077407.3; dated Mar. 2, 2017, pp. 1-16.

* cited by examiner fig. 1

POSITION RECOVERY VIA DUMMY LANDING PATTERNS

BACKGROUND OF THE INVENTION

Embodiments of this invention generally relate to an elevator system, and more particularly, to the position reference system of an elevator system.

Modern elevator systems are generally designed to be capable of determining the current position of the elevator systems' cars. Elevator position devices are commonly used to determine current car position. However, after a power loss or hard system reset, existing elevator control systems may not retain current car position data. Furthermore, the systems may not be able to determine the current positions of their cars for various reasons. For example, shaft encoders are commonly used to monitor elevator car position. These encoders work by counting the number and direction of shaft rotations, or partial rotations, following an absolute position determination. Based on the number of rotations since determining a known position, a processor is able to determine the current location of an elevator car. However, following a power outage, the encoders generally lose the data pertaining to the number of rotations, and possibly the data identifying the last known absolute position. Without this data, the shaft encoders are unable to determine current car position without an interruption of service to perform a position recovery procedure such as a terminal position recovery run.

In a terminal position recovery run, an elevator is run in one direction (up or down) in its hoistway until an initialization switch is activated. Because initialization switches are located at distal ends of the hoistway, activation of one of the switches indicates that the car is physically located at the corresponding end of the hoistway, a known absolute position. The position monitoring system is then able to set the current car position as a known position. Once an absolute position is established, a shaft encoder or the like can be used to determine relative movement, thereby tracking the current car position. This method generally involves placing some form of sensor at each terminal landing (the upper and lowermost landings), as well as on the elevator car. In some known systems, initialization magnets and door zone magnets are placed at both the top and bottom landing.

In these known systems, when an elevator car is located between the terminal landings when car position information is lost, the elevator car must be moved to one of the terminal landings to reset the elevator position device. When the elevator car position information is lost near one of the terminal landings, such that the elevator position device detects one of the terminal magnets, the elevator controller cannot use that landing to reset the elevator position device. Accordingly, the elevator controller causes the elevator car to perform a correction run to the other end of the hoistway to reset the elevator position device. While such long correction runs ensure high performance leveling of elevator cars, they require a large amount of time to complete and are detrimental to elevator performance.

SUMMARY OF THE INVENTION

According to an exemplary embodiment of the invention, an elevator system is provided including an elevator hoistway having a plurality of landings. An elevator car is configured to move within the elevator hoistway. The elevator system also includes a position determining system having a plurality of landing position indicators. At least one of the plurality of landing position indicators is mounted proximate to each of the plurality of landings. The position determining system also includes a plurality of dummy position indicators. Each of the dummy position indicators is mounted within the elevator hoistway at a predetermined vertical position between various of the plurality of landing position indicators. The position determining system additionally includes a sensor mounted to the elevator car and configured to determine when the elevator car is adjacent one of the plurality of landing position indicators or one of the plurality of dummy position indicators. The plurality of landing position indicators and the plurality of dummy position indicators are positioned to form a sequence of unique patterns.

Alternatively, in this or other embodiments of the invention, each uniquely identifiable pattern has a length less than half the length of the hoistway.

Alternatively, in this or other embodiments of the invention, the elevator system also includes an encoder. The encoder is configured to determine the distance moved by the elevator.

Alternatively, in this or other embodiments of the invention, the elevator system also includes a processor. The processor is configured to store the sequence of uniquely identifiable patterns.

Alternatively, in this or other embodiments of the invention, the processor is configured to detect at least one of the sequence of unique patterns based on the distance moved by the elevator car and the output of the encoder.

Alternatively, in this or other embodiments of the invention, the position determining system is configured to determine an absolute position of the car based on the detection of at least one of the sequence of unique patterns.

Alternatively, in this or other embodiments of the invention, the processor is configured to perform a learn run from a first terminal landing near a first end of the hoistway to a second terminal landing near a second end of the hoistway. During the learn run, the processor verifies the positioning of the indicators.

Alternatively, in this or other embodiments of the invention, the processor is further configured to use the information collected from the learn run to create the sequence of unique patterns.

Alternatively, in this or other embodiment of the invention, the system includes an external processor configured to use information collected from the learn run to create the sequence of unique patterns.

Alternatively, in this or other embodiments of the invention, the plurality of landing position indicators and the plurality of dummy position indicators are magnetic vanes.

Alternatively, in this or other embodiments of the invention, the plurality of landing position indicators and the plurality of dummy position indicators are optical vanes.

According to another embodiment of the invention, a method of performing a correction run in an elevator system within a hoistway following a loss of power is provided including moving the elevator car in the hoistway. A distance measuring device is used to determine a distance the elevator car is moved in the hoistway. A sensor detects when the elevator car is proximate to at least one of a plurality of landing position indicators and a plurality of dummy position indicators. Each of the plurality of landing position indicators and each of the plurality of dummy position indicators is mounted in the hoistway to form a sequence of unique patterns along a length of the hoistway. The sensor outputs at least one signal indicating when the elevator car is proximate to at least one of the plurality of landing position indicators or at least one of the plurality of dummy position indicators. The position of the elevator car is determined based on the distance the elevator car is moved and the at least one signal output form the sensor.

Alternatively, in this or other embodiments of the invention, the method of performing a correction run may further include accessing a last known position of the elevator car. A minimum travel distance in a first direction required to determine an absolute position of the elevator car based on the distance the elevator car is moved and the at least one signal output from the sensor is estimated. A minimum travel distance in a second direction required to determine an absolute position of the elevator car based on the distance the elevator car is moved and the at least one signal output from the sensor is estimated. The estimated travel distance in the first direction is compared with the estimated travel distance in the second direction to determine a shortest estimated travel distance. The elevator car is moved in the direction of the shortest estimated travel distance.

Alternatively, in this or other embodiments of the invention, the last known position of the elevator car is stored in the elevator system.

Alternatively, in this or other embodiments of the invention, the minimum travel distance in the first direction and the minimum travel distance in the second direction are calculated by a software of the elevator system.

Alternatively, in this or other embodiments of the invention, the minimum travel distance in the first direction and the minimum travel distance in the second direction are calculated based on an assumption that the elevator car has not moved from the last known position.

Alternatively, in this or other embodiments of the invention, the minimum travel distance in the first direction and the minimum travel distance in the second direction are calculated based on the sequence of unique patterns stored within the elevator system.

According to yet another embodiment of the invention, a position determining system is provided including a plurality of first indicators and a plurality of second indicators. Each of the plurality of second position indicators is mounted at a predetermined vertical position between various of the plurality of first indicators. A sensor is movable relative to the plurality of first indicators and the plurality of second indicators. The sensor is configured to determine when the sensor is adjacent one of the plurality of first indicator of one of the plurality of second indicators. The plurality of first position indicators and the plurality of second position indicators are position to form a sequence of unique patterns.

Alternatively, in this or other embodiments of the invention, a processor is configured to store the sequence of unique patterns.

Alternatively, in this or other embodiments of the invention, the plurality of first position indicators and the plurality of second position indicators are magnetic vanes.

Alternatively, in this or other embodiments of the invention, the plurality of first position indicators and the plurality of second position indicators are optical vanes.

BRIEF DESCRIPTION OF THE DRAWINGS

The foregoing and other features, and advantages of the invention are apparent from the following detailed description taken in conjunction with the accompanying drawings in which.

The detailed description of the invention describes exemplary embodiments of the invention, together with some of the advantages and features thereof, by way of example with reference to the drawings.

DETAILED DESCRIPTION OF THE INVENTION

Figure 1:
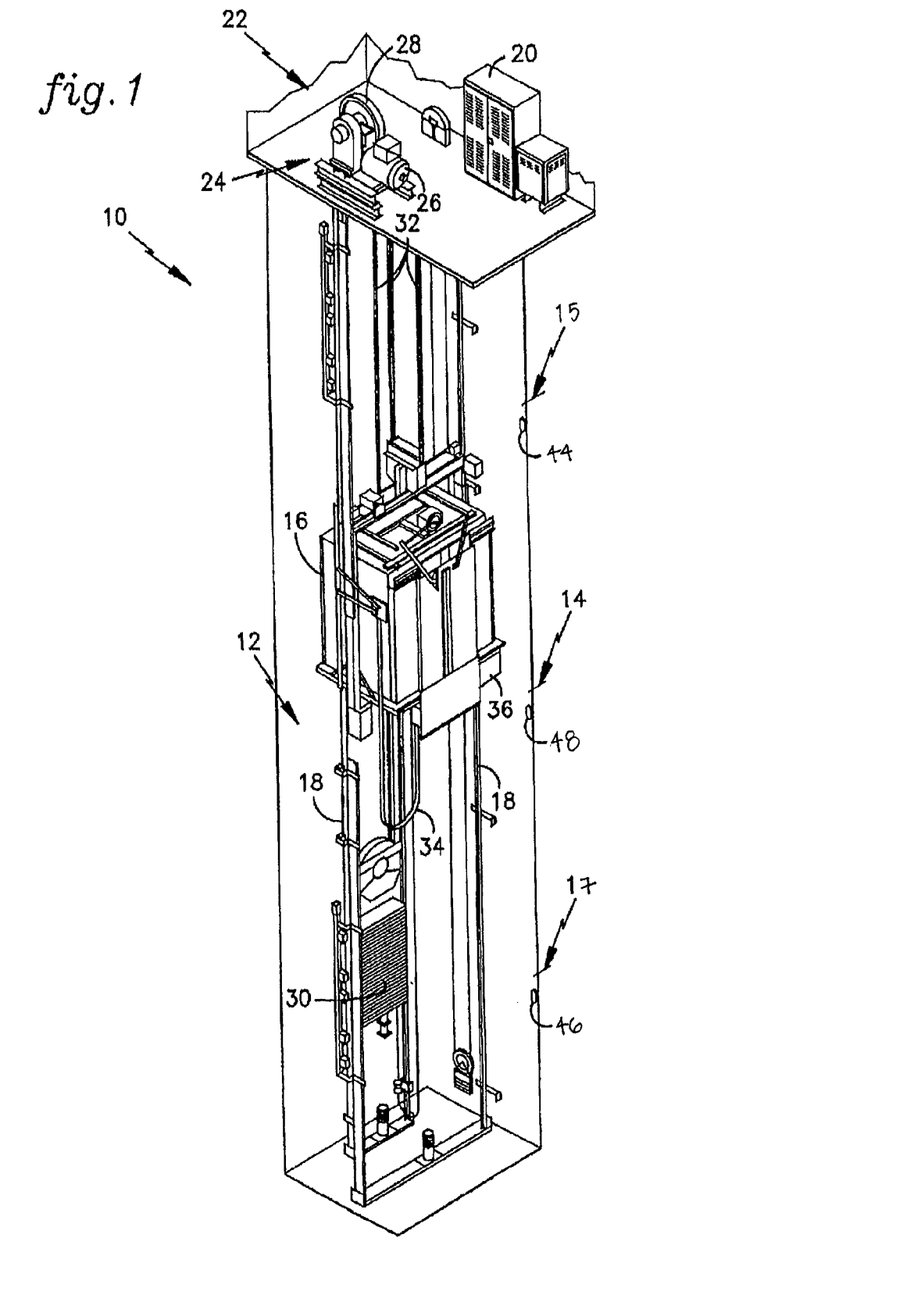
FIG. 1 is a perspective view of an exemplary elevator system.
Figure 2:
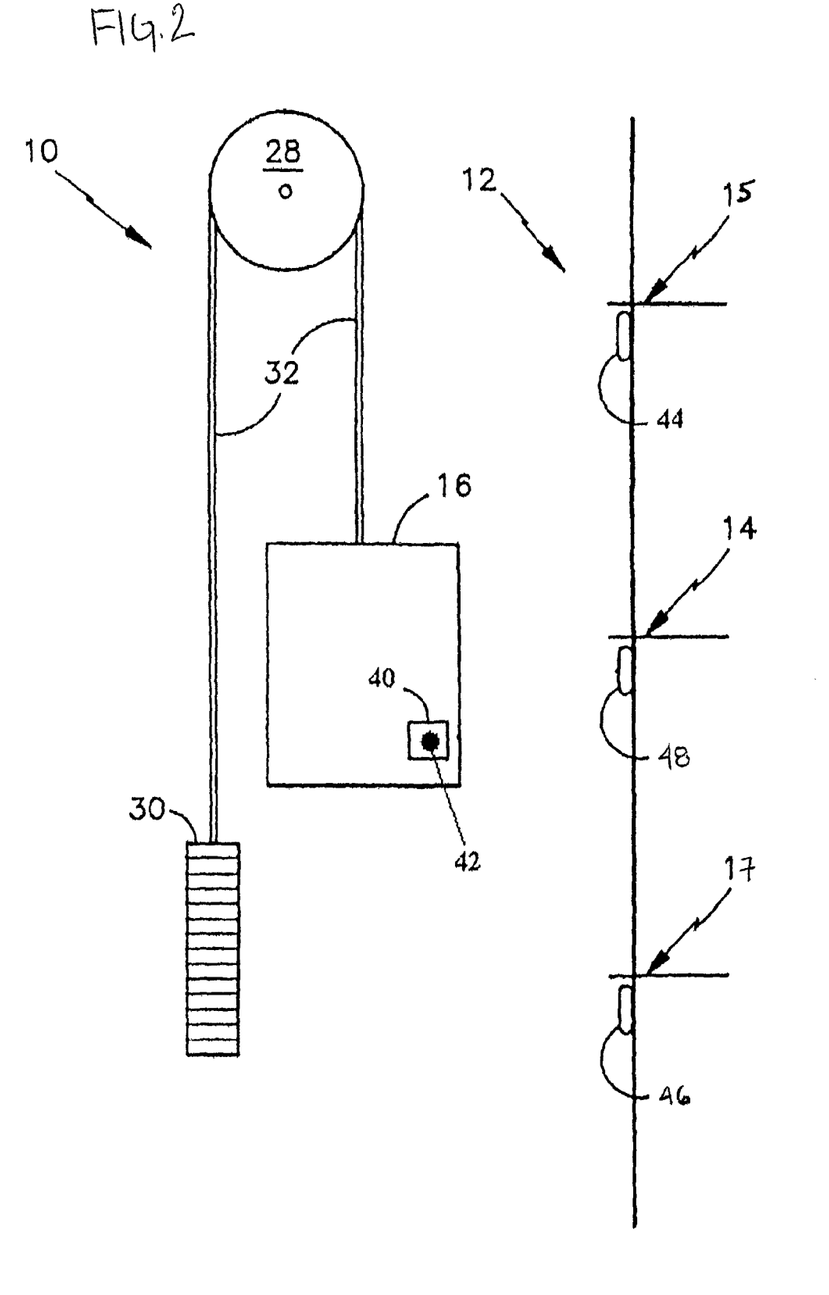
FIG. 2 is a schematic diagram of a portion of an elevator system according to an exemplary embodiment of the invention.

Referring now to FIGS. 1 and 2, an exemplary elevator system 10 is illustrated. The elevator system 10 is disposed in a building having a plurality of floors. The building includes a hoistway 12 with a plurality of landings 14 that correspond to the plurality of floors. An elevator car 16 is disposed in the hoistway 12 such that the elevator car 16 may travel along elevator guide rails 18 disposed vertically in the hoistway 12. In the illustrated elevator system 10, an elevator controller 20 is located in the machine room 22 and monitors and provides system control of the elevator system 10. The positioning of the controller 20 is not critical to the invention; other elevator systems within the scope of the invention may position the elevator controller within the hoistway 12 for example. The elevator controller 20 provides a control signal to a drive machine 24. The drive machine 24 moves the elevator car 16 in the hoistway 12 in response to the control signal. In one embodiment of the invention, the drive machine 24 includes a drive motor 26 and a drive sheave 28. The drive sheave 28 is coupled to the drive motor 26 such that rotational output of the drive motor 26 is transmitted to the drive sheave 28. One or more tension ropes 32 connect the elevator car 16 to a counterweight 30. The tension ropes may be belts, cables, ropes, or any other known element for coupling the car 16 and the counterweight 30. The rotational output of the drive motor 26 is transmitted to the elevator car 16 via the tension ropes 32 that are guided around the drive sheave 28. A travelling cable 34 is used to provide an electrical connection between the elevator controller 20 and the electrical equipment on the elevator car 16. Additional elevator systems including hydraulic and linear motor systems are within the scope of the invention. The invention may be utilized in elevator systems with or without machine rooms.

An elevator position determining system 40 is used in conjunction with the elevator system 10 to accurately determine the position of the elevator car 16 within the hoistway 12. The position determining system 40 includes at least one sensor 42 mounted to the elevator car 16. The sensor 42 may be located at any position on the elevator car 16, such as at the top or bottom of the car 16, for example.

The position determining system 40 also includes a top terminal position indicator 44 located near the top of the elevator hoistway 12, adjacent the top landing 15 of the elevator system 10, and a bottom terminal position indicator 46 located near the bottom of the hoistway 12, adjacent the bottom landing 17. In conventional elevator systems 10, when the elevator car 16 reaches either the top or the bottom terminal position indicator 44, 46, the elevator system 10 registers the absolute position of the car 16 in the hoistway 12. A landing position indicator 48 is disposed at each of the other landings 14 in the elevator system 10. Each landing position indicator 48 may be mounted, for example, to a respective landing door strut or door sill using a known mounting device such as a mounting bracket. An advantage of mounting the landing position indicators 48 to the landing door struts or door sills is that the position of the indicators 48 would change with the settling of the building, and thus would provide a true indication of the position of each landing 14. Alternatively, the landing position indicators 48 may be mounted on the guide rails 18 for the elevator car 16.

The landing position indicators 48 may comprise any suitable position indicators or smart vanes known in the art. The landing position indicators 48 preferably do not include any unique identifying information relative to the landing 14 at which the landing position indicator 48 is mounted. As such, the system 40 can be implemented more easily and at a lower cost than systems which rely on indicators that include uniquely identifiable information. The landing position indicators 48 indicate to the position determining system 40 only that the elevator car 16 is at a landing 14, not which landing 14, in the hoistway 12. In one embodiment of the invention, the landing position indicators 48 are magnetic or optical vanes. In an embodiment where the landing position indicators 48 are magnetic, the sensor 42 may be a Hall Effect device that produces an electrical output signal when placed in close proximity to a magnet. In an embodiment where the landing position indicators 48 are optical vanes, the sensor 42 may be an optical sensor that uses light reflected off of the optical vane to determine a position relative to a landing 14. As illustrated in FIG. 2, the sensor 42 and the landing position indicators 48 are arranged such that the sensor 42 is disposed near one of the plurality of landing position indicators 48 when the elevator car 16 is located at a landing 14. By orienting the sensor 42 and the landing position indicators 48, the sensor 42 can detect the presence of each landing position indicator 48 as the elevator car 16 and the sensor 42 travel up and down within the hoistway 12.

Figure 3:
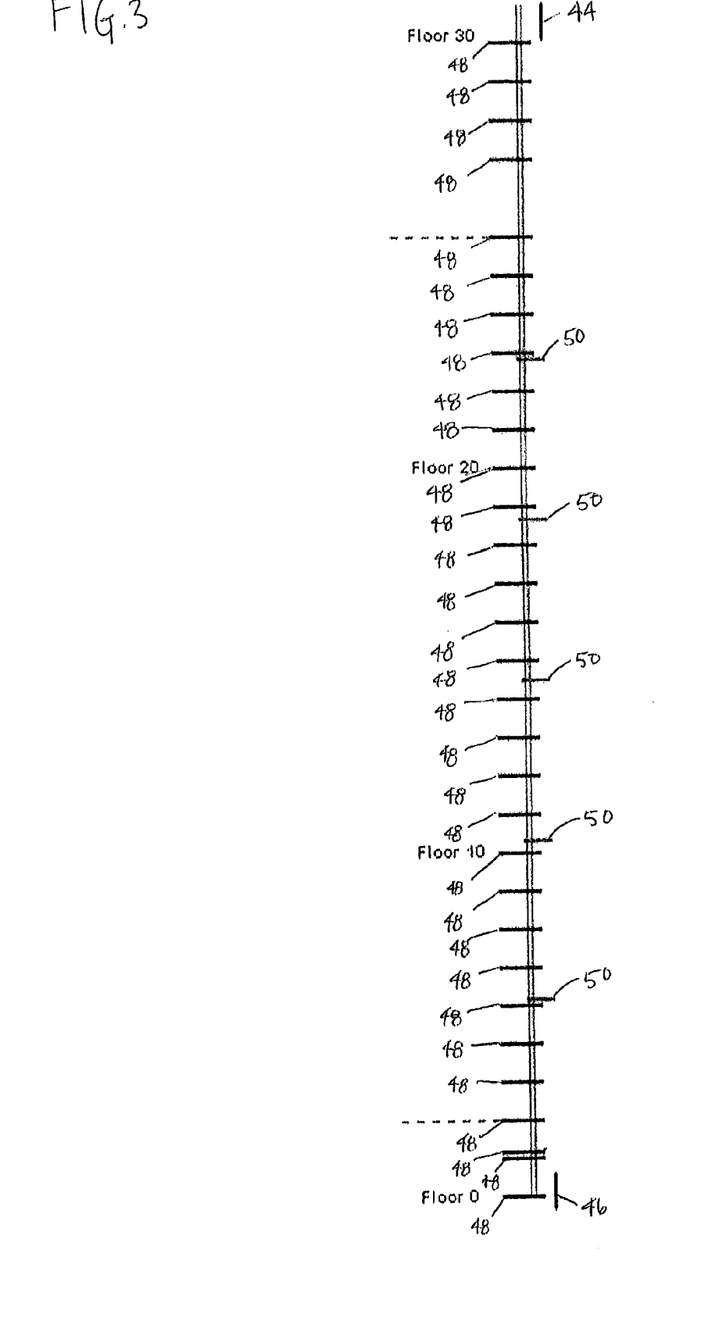
FIG. 3 is a schematic diagram of a portion of an elevator hoistway according to an exemplary embodiment of the invention.
Figure 4:
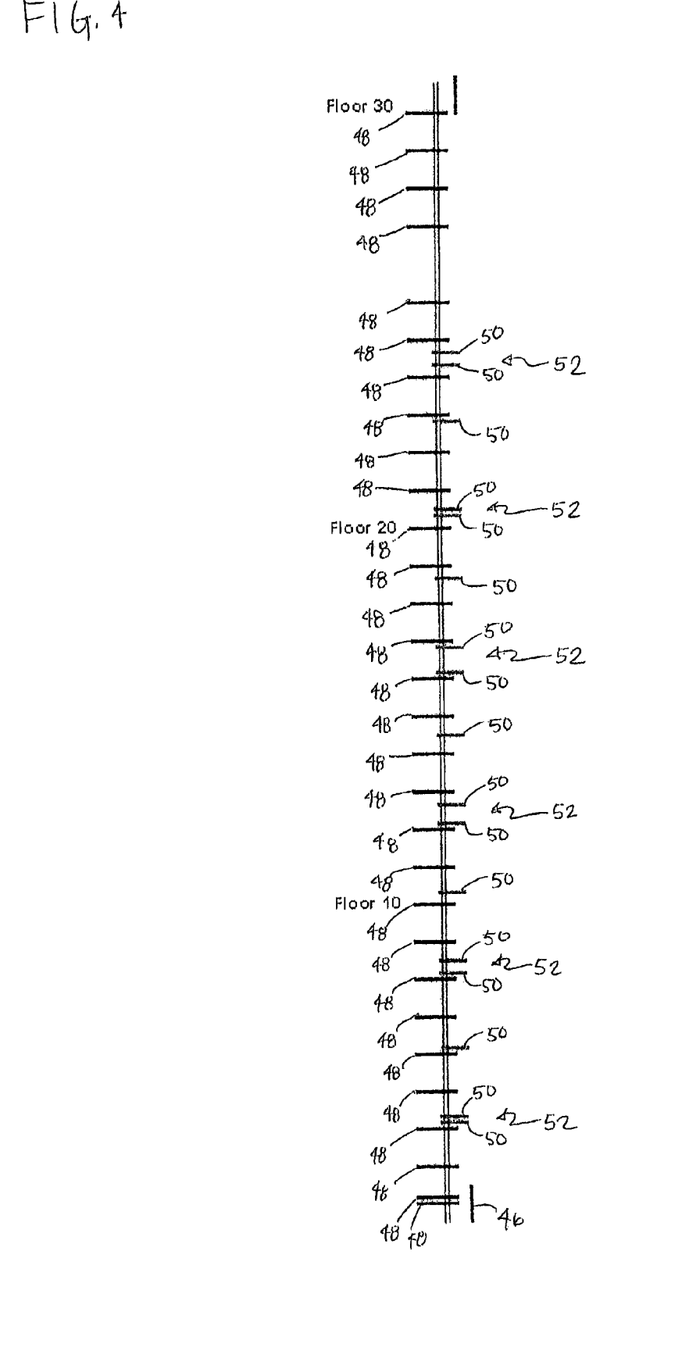
FIG. 4 is a schematic diagram of a portion of another elevator hoistway according to an exemplary embodiment of the invention.

Because the landing position indicators 48 do not indicate which landing 14 the car 16 is at, position determining systems 40 of an elevator system 10 having equally spaced landings 14 require additional information to determine the absolute position of the cars 16. Referring now to FIGS. 3 and 4, dummy position indicators 50 may be located throughout the hoistway, and particularly in the portion of the hoistway 12 having equally spaced landings 14. The dummy position indicators 50 are aligned in the same vertical plane as the landing position indicators 48. In one embodiment of the invention, the dummy position indicators 50 are the same type of position indicators as the landing position indicators 48. Similar to the landing position indicators 48, the dummy position indicators 50 do not contain unique identification information about an adjacent landing 14.

Although detailed examples are provided in which the distance between the landings 14 is uniform, this is not required. According to various embodiments of the invention, the spacing between the landings 14 may differ randomly or according to a convention or pattern without departing from the scope of the invention. In some situations, having unique distances between some of the landings 14 may actually reduce the number of dummy position indicators 50 required to be able to accurately determine actual elevator car position within a desired travel range where the unique distances allow for more opportunities to establish unique distances between the landing indicators 48 and the dummy indicators 50.

In FIG. 3, the landing position indicators 48 for floors 3 through 26 are equally spaced in the hoistway 12, such as by a distance of 3 meters, for example. The dummy position indicators 50 are located between the equally spaced landing position indicators 48 at intervals throughout the hoistway 12. For example, in the exemplary system 10 illustrated in FIG. 3, four landing position indicators 48 are located between two adjacent dummy position indicators 50. Each dummy position indicator 50 is mounted at a unique position between two adjacent landing position indicators 48 such that the spacing between the landing position indicators 48 and each dummy position indicator 50 is distinct. The dummy position indicator 50 located between floors six and seven may be spaced a distance from the landing position indicator 48 of floor six, such as by a distance of about 0.5 meters for example. The next consecutive dummy position indicator 50 is spaced a different distance from the landing position indicator 48 of floor ten, such as at a distance of about 1 meter, for example. The difference in spacing at consecutive dummy position indicators 50 is preferably large enough so as to be resistant to errors in the system 10, for example slip and rope stretch. The placement of the dummy position indicators 50 in conjunction with the landing position indicators 48 in the hoistway 12 forms a sequence of unique patterns. The sequence and its association with the landings 14 of the hoistway 12 may be stored, such as with a processor for example, in the controller 20. As the elevator car 16 travels through the hoistway 12, the sensor 42 will detect the presence of an indicator 48, 50 and the encoder of the drive machine 24 will determine the distance the elevator car 16 has moved between adjacent indicators 48, 50. The processor may compare the distance the elevator car 16 has moved with the output of the sensor 42 to identify a unique pattern. The position determining system 40 can determine the absolute position of the elevator car 16 after travelling a distance shorter than to one of the terminal position indicators 44, 46 based on which unique pattern of the sequence of unique patterns is identified.

The uniqueness of each pattern formed by the landing position indicators 48 and the dummy position indicators 50 is determined by the quantity and spacing of the dummy position indicators 50 throughout the hoistway 12. As the number of equally spaced landings 14 in a hoistway 12 increases, more dummy position indicators 50 are preferably used to reduce the maximum distance the elevator car 16 may travel to encounter a unique sub-pattern during a correction run. As illustrated in FIG. 4, clusters 52 of dummy position indicators 50 may be spaced at intervals throughout the hoistway 12. Each cluster 52 may include more than one dummy position indicators 50, and the number of dummy position indicators 50 in consecutive clusters 52 may vary. The spacing of the dummy position indicators 50 of a cluster 52 relative to the adjacent landing position indicators 48 and the spacing between the dummy position indicators 50 in a cluster 52 uniquely identifies that position in the hoistway 12.

In the exemplary system of FIG. 4, a cluster 52 between floor four and floor five includes two dummy position indicators 50. One of the dummy position indicators 50 is located a distance, such as about 0.5 meters for example, from the landing position indicator 48 of floor four. The two dummy position indicators 50 are also separated by a distance, such as about 0.5 meters for example. Located adjacent the landing position indicator 48 of floor six, may be a single dummy position indicator 50. Another cluster 52, such as between floors eight and nine for example, may again include two dummy position indicators 50. The distance between one of the dummy position indicators 50 and the landing position indicator 48 of floor eight may be the same distance as between one of the dummy position indicators 50 and the landing position indicator 48 of floor four. In such cases, the spacing between the two dummy position indicators 50 within the cluster 52 is different than the spacing between the two dummy position indicators 50 at the previous cluster 52. Alternatively, the distance between one of the dummy position indicators 50 and the landing position indicator 48 of floor eight may be the different than the distance between one of the dummy position indicators 50 and the landing position indicator 48 of floor four. In such instances, the spacing between the two dummy position indicators 50 in the cluster 52 may be distinct or may be the same as the spacing between the two dummy position indicators 50 of another cluster 52. According to various embodiments of the invention, the dummy position indicators 50 may comprise different types of sensors than the landing position indicators 48. Additionally, various embodiments of the invention may utilize different types of dummy landing position indicators 50 either in the same cluster 52 or in different clusters 52.

Figure 5:
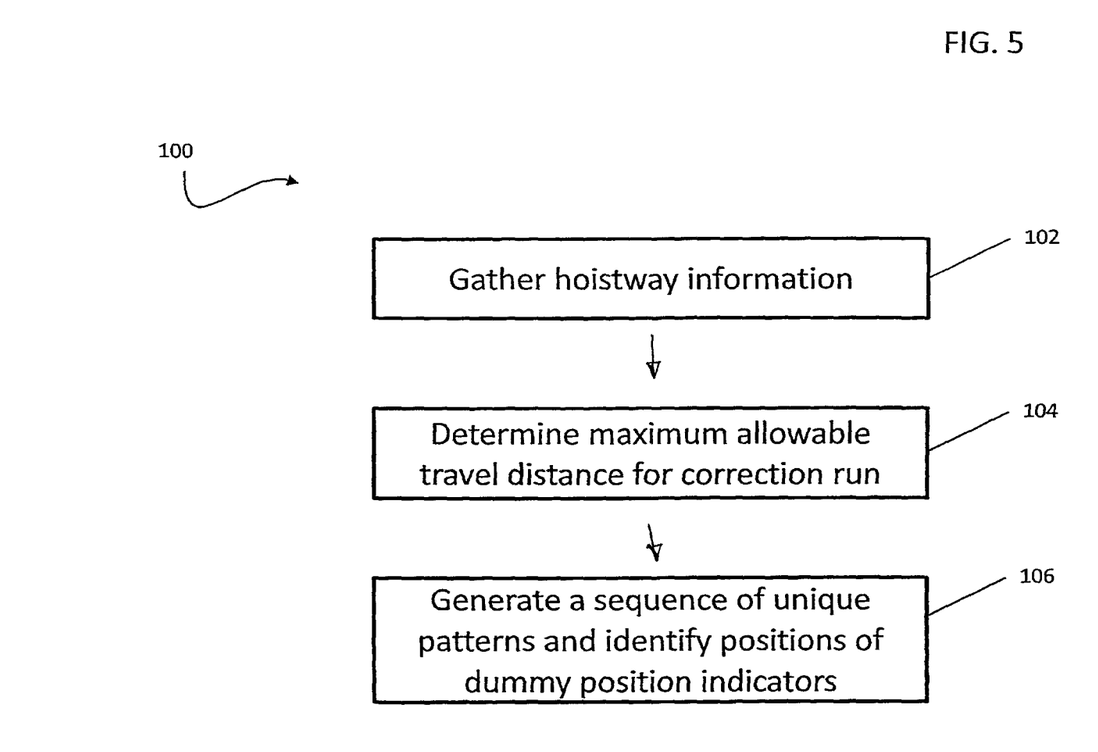
FIG. 5 is a block diagram of a method of determining the positioning of a plurality of dummy position indicators in an elevator hoistway according to an exemplary embodiment.

Referring now to FIG. 5, a method 100 of determining the placement of the dummy position indicators 50 to form a unique pattern is illustrated. As shown in block 102, the hoistway information for the elevator system 10 is gathered, such as by performing a learn run for example. During a learn run, the system 10 learns the location of each landing 14 in the hoistway 12 based on the placement of the landing position indicators 48 and the terminal position indicators 44, 46. The maximum desired travel distance of the elevator car 16 during a correction run may also be defined as shown in block 104. Based on the number of landings 14 in the hoistway 12 and the maximum desired travel distance of the elevator car 16 during a correction run, the placement of each dummy position indicator 50 may be determined, see block 106, to form a sequence of unique patterns.

In one embodiment, the elevator system 10 includes software that uses the data collected during the learn run to generate the sequence of unique patterns that should be installed in the hoistway 12. The system 10 determines based on the known distances in the hoistway 12, the minimum number and placement of a plurality of dummy position indicators 50 throughout the hoistway 12 required to form a sequence of unique patterns such that a correction run of the system 10 is no longer than the distance defined by a user's preference. Specifically, the software determines between which landings 14 each dummy position indicator 50 or cluster 52 should be installed as well as the spacing of each dummy position indicator 50 relative to the adjacent landings, and the spacing of each dummy position indicators relative to another dummy position indicator 50 within a cluster 52. The software stores the sequence of unique patterns as well as the association of each unique pattern with a corresponding landing 14 in the hoistway 12. In addition, the software may be configured to verify that the dummy position indicators 50 are located at the correct position within the hoistway 12, as well as to indicate if a dummy position indicator 50 is at an incorrect location.

In various embodiments of the invention, the software configured to generate a sequence of unique patterns based on a system configuration and maximum desired travel distance during a correction run is installed on a laptop or other external device. The data collected during the learn run of the elevator system 10 may be transferred to the laptop to generate a sequence for that system 10. Alternatively, the software on the laptop or external device may be used prior to installation of the elevator system 10 in the hoistway 12 to determine the number and placement of the dummy position indicators 50. In yet another embodiment, the location of each dummy position indicator 50 is manually calculated based on the data collected from the elevator 10 during the learn run.

Figure 6:
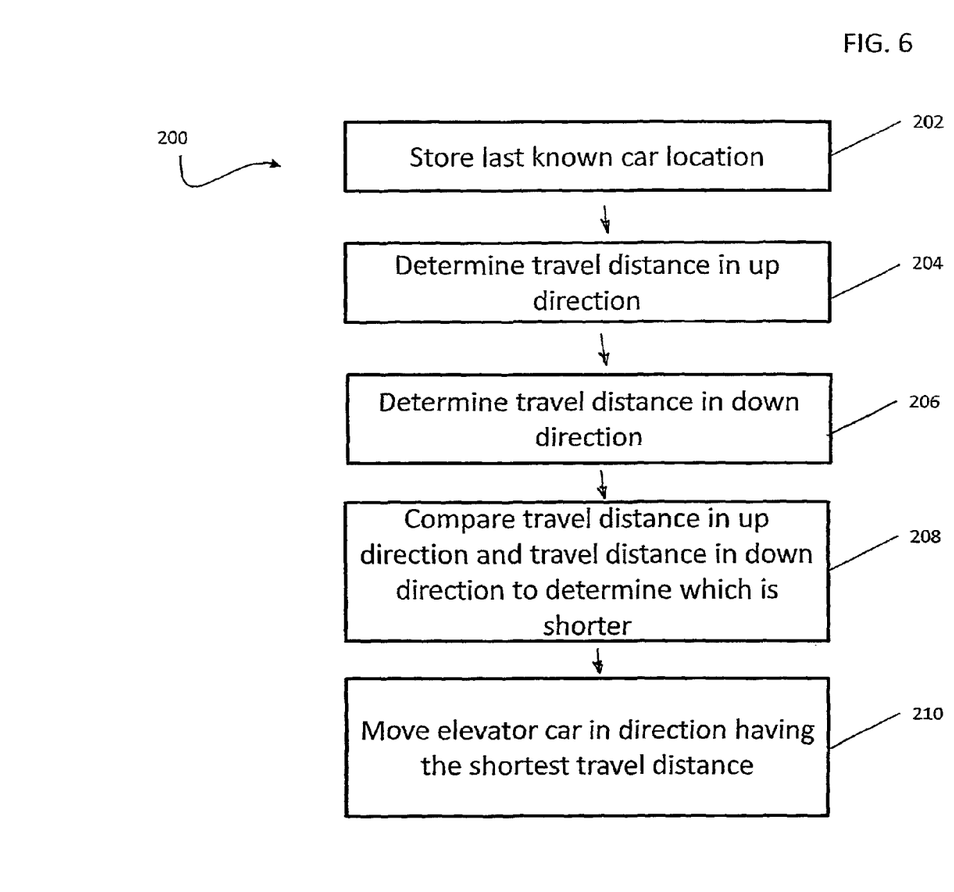
FIG. 6 is a block diagram of a method of performing a correction run according to an embodiment of the invention.

Referring now to FIG. 6, method 200 of performing a correction run is illustrated. If a power loss occurs while the system 10 is operational, the last known location of the car 16 in the hoistway 12 is stored within the system 10, shown in block 202. The software of the elevator system then calculates the travel distance required in both the up direction and the down direction to determine the absolute position of the elevator car 16, see blocks 204 and 206. The travel distances are calculated based on the assumption that the elevator car 16 has not moved from the previously known location. The software then compares the travel distance in the up direction and the travel distance in the down direction, as shown in block 208, to determine which distance is shorter. The elevator system 10 then moves the elevator car 16 in the direction having the shortest travel distance, see block 210.

The inclusion of dummy position indicators 50 in the hoistway 12 to create a unique pattern forms a robust absolute position reference for the car 16. The dummy position indicators 50 are more cost effective than the sensors typically used in absolute position reference systems. In addition, the dummy position indicators 50 may be adapted for use in any elevator system 10, regardless of the number of equally spaced landings 14.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An elevator system comprising:
   an elevator hoistway comprising a plurality of landings;
   an elevator car configured to move within the elevator hoistway; and
   a position determining system including:
      a plurality of landing position indicators, at least one of the plurality of landing position indicators being mounted proximate to each of the plurality of landings;
      a plurality of dummy position indicators, each of the plurality of dummy position indicators being mounted within the elevator hoistway at a predetermined vertical position between various of the plurality of landing position indicators; and
      a sensor, mounted to the elevator car, and configured to determine when the elevator car is adjacent one of the plurality of landing position indicators or one of the plurality of dummy position indicators, wherein the plurality of landing position indicators and the plurality of dummy position indicators are positioned to form a sequence of unique patterns.

2. The elevator system according to claim 1, wherein each unique identifiable pattern has a length less than half a length of the hoistway.

3. The elevator system according to claim 1, further comprising an encoder configured to determine a distance moved by the elevator.

4. The elevator system according to claim 1, further comprising a processor configured to store the sequence of unique patterns.

5. The elevator system according to claim 4, wherein the processor is further configured to detect at least one of the sequence of unique patterns based on the distance moved by the elevator car and an output of the encoder.

6. The elevator system according to claim 5, wherein the position detection system is configured to determine an absolute position of the elevator car based on the detection of at least one of the sequence of unique patterns.

7. The elevator system according to claim 5, wherein the processor is further configured to perform a learn run from a first terminal landing near a first end of the hoistway to a second terminal landing near a second end of the hoistway to verify the positioning of the indicators.

8. The elevator system according to claim 7, wherein the processor is further configured to use information collected from the learn run to create the sequence of unique patterns.

9. The elevator system according to claim 7, further comprising an external processor configured to use information collected from the learn run to create the sequence of unique patterns.

10. The elevator system according to claim 1, wherein the plurality of landing position indicators and the plurality of dummy position indicators are magnetic vanes.

11. The elevator system according to claim 1, wherein the plurality of landing position indicators and the plurality of dummy position indicators are optical vanes.

12. A method of determining a position of an elevator car within a hoistway following a loss of power, the method comprising:

moving the elevator car in the hoistway;

using a distance measuring device to determine a distance the elevator car is moved in the hoistway;

using a sensor to detect when the elevator car is proximate to at least one of a plurality of landing position indicators and a plurality of dummy position indicators, each of the plurality of landing position indicators and each of the plurality of dummy position indicators being mounted in the hoistway to form a sequence of unique patterns along a length of the hoistway;

outputting, from the sensor, at least one signal indicating when the elevator car is proximate to at least one of the plurality of landing position indicators or at least one of the plurality of dummy position indicators; and determining a position of the elevator car based on the distance the elevator car is moved and the at least one signal output from the sensor.

13. The method according to claim 12, further comprising accessing a last known position of the elevator car;

estimating a minimum travel distance in a first direction required to determine an absolute position of the elevator car based on the distance the elevator car is moved and the at least one signal output from the sensor;

estimating a minimum travel distance in a second direction required to determine an absolute position of the elevator car based on the distance the elevator car is moved and the at least one signal output from the sensor;

comparing the estimated travel distance in the first direction and the estimated travel distance in the second direction to determine a shortest estimated travel distance; and moving the elevator car in the direction of the shortest estimated travel distance.

14. The method according to claim 12, wherein the last known position of the elevator car is stored in the elevator system.

15. The method according to claim 12, wherein the minimum travel distance in the first direction and the minimum travel distance in the second direction are calculated by a software of the elevator system.

16. The method according to claim 12, wherein the minimum travel distance in the first direction and the minimum travel distance in the second direction are determined based on an assumption that the elevator car has not moved from the last known position.

17. The method according to claim 15, wherein the minimum travel distance in the first direction and the minimum travel distance in the second direction are calculated based on the sequence of unique patterns stored within the elevator system.

18. A position determining system including:

a plurality of first position indicators;

a plurality of second position indicators, each of the plurality of second position indicators being mounted at a predetermined vertical position between various of the first position indicators; and a sensor, movable relative to the plurality of first position indicators and the plurality of second position indicators, the sensor being configured to determine when it is adjacent one of the plurality of first position indicators or one of the plurality of second position indicators, wherein the plurality of first position indicators and the plurality of second position indicators are positioned to form a sequence of unique patterns.

19. The position determining system according to claim 18, further comprising a processor configured to store the sequence of unique patterns.

20. The position determining system according to claim 18, wherein the plurality of first position indicators and the plurality of second position indicators are magnetic vanes.

21. The position determining system according to claim 18, wherein the plurality of first position indicators and the plurality of second position indicators are optical vanes.

* * * * *